A. H. PELOUBET.
SECTIONAL VEHICLE TIRE.
APPLICATION FILED DEC. 20, 1910.
991,744.
Patented May 9, 1911.
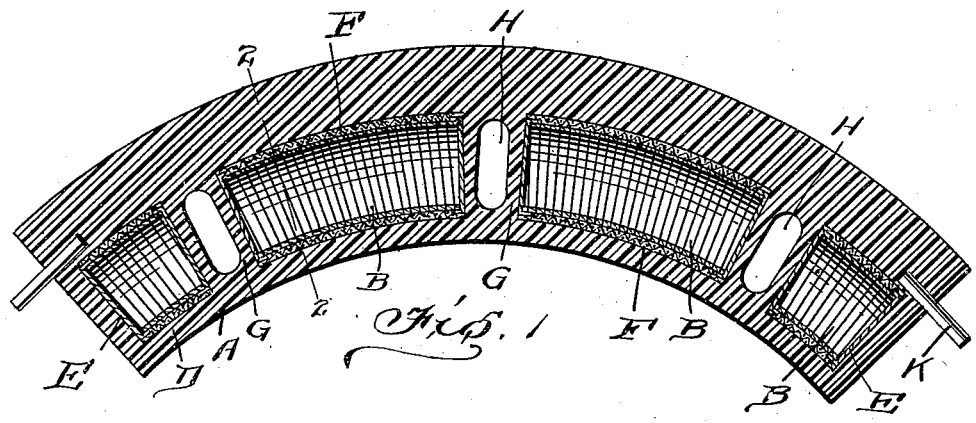
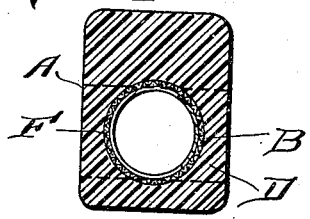
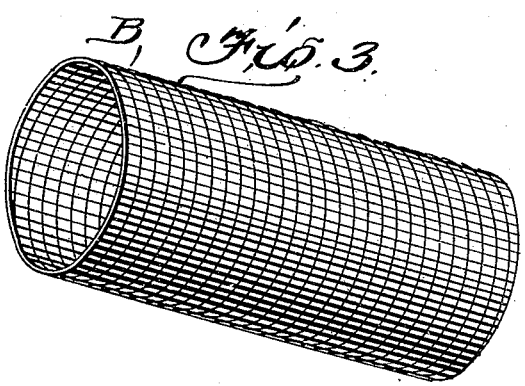
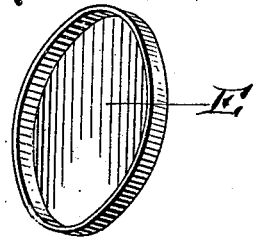
Witnesses
Geo. L. Thom
J. W. Sherwood
Inventor
A. H. Peloubet.
By Franklin N. Hough
Attorney

UNITED STATES PATENT OFFICE.

ALEXANDER H. PELOUBET, OF NEWARK, NEW JERSEY.

SECTIONAL VEHICLE-TIRE.

991,744.  Specification of Letters Patent.  Patented May 9, 1911.

Application filed December 20, 1910. Serial No. 598,310.

*To all whom it may concern:*

Be it known that I, ALEXANDER H. PELOUBET, a citizen of the United States, residing at Newark, in the county of Essex and State of New Jersey, have invented certain new and useful Improvements in Sectional Vehicle-Tires; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in sectional tires for vehicle wheels, the object in view being to generally improve upon and simplify the construction of cushion tires and minimize the cost of construction.

The invention consists essentially in the provision of a tire made up of sections in which are vulcanized sections of coiled springs adapted to form a brace to the fabric wall and make the tread surface as rigid as would be the case if the entire tire were of a solid composition.

The invention comprises various details of construction and combinations and arrangements of parts which will be hereinafter fully described and then specifically defined in the appended claims.

I illustrate my invention in the accompanying drawings, in which:—

Figure is a central vertical section through a section of a tire made in accordance with my invention. Fig. 2 is a cross sectional view on line 2—2 of Fig. 3. Fig. 3 is a detail perspective view of the coil, and Fig. 4 is a detail view of a cap adapted to be fitted to the end of the coil.

Reference now being had to the details of the drawings by letter, A, designates a section of a tire, the body portion of which is made preferably of a solid rubber or composition in which are vulcanized at intervals coiled springs B, which latter are made preferably of a flat leaf coiled with the convolutions in contact with one another, thus making a continuous bearing surface to the envelop of rubber D and forming a secure brace to reinforce the wall formed about the coils. Flanged caps E are fitted over the ends of each coil and each coil wrapped with a heavy vulcanized canvas F. Intermediate the coils are transverse slots H formed in the rubber and the opposite walls of the slots prevent any longitudinal movement to the coils and serve as a cushioning means to the tire. Dowels K are embedded in the ends of the sections and are adapted to engage apertures to hold the sections together.

In the construction of the sections of the tires, the springs coiled as described and wrapped with canvas with caps upon the ends of the coils are laid in the rubber composition with their ends preferably an inch or so apart which will leave a composite wall between the ends, after which the coils are vulcanized into a hard rubber shoe. By this construction of tire, the amount of stock used in the tire is appreciably reduced, preferably half, and at the same time the weight of the tire is reduced appreciably and a tire is afforded which will have as rigid and hard a tread as would otherwise be the case in the event of the entire tire being made solid of composition material.

What I claim to be new is:—

A solid tire section having embedded therein, in alinement with one another, a series of spring coils, the convolutions of which are in contact with one another, the portions of the tire interposed between the sections having openings therein, and flanged caps fitted to the end of each coil.

In testimony whereof I hereunto affix my signature in the presence of two witnesses.

ALEXANDER H. PELOUBET.

Witnesses:
CHARLES SMITH,
JAMES CRUSO.

Copies of this patent may be obtained for five cents each, by addressing the "Commissioner of Patents, Washington, D. C."